United States Patent Office 2,839,531
Patented June 17, 1958

2,839,531
PROCESS FOR PREPARING 2-BENZTHIAZYL-SULFENO MORPHOLIDE

Vincent Kerrigan and Arthur Lambert, Manchester, England, assignors to Imperial Chemical Industries Limited, London, England, a corporation of Great Britain No Drawing. Application September 19, 1955
Serial No. 535,267

4 Claims. (Cl. 260—247.1)

This invention relates to the manufacture of an organic compound namely 2-benzthiazyl sulphenomorpholide.

According to the invention we provide an improved process for the manufacture of this compound.

The process comprises interacting at raised temperature an alkali or other metal salt of 2-mercaptobenzthiazole and N-chloromorpholine in an inert organic solvent. As such solvents there may be used inter alia benzene, toluene, xylene and other aromatic hydrocarbons, dioxane, petrol ether and chlorinated derivatives of these. The metal salt and the N-chloromorpholine can be used in substantially equimolecular proportions.

Temperatures of 40–70° C. are convenient, although reaction takes place outside these limits, and temperatures of about 50–60° C. are generally the best.

The compound is obtained in nearly theoretical yield and is of good purity, being free or substantially free from dibenzthiazyl disulphide. This latter compound, which is a semi-ultra rubber vulcanisation accelerator, is very readily produced in processes for making benzthiazyl sulphenomorpholide and its presence in any considerable proportion is very disadvantageous since it renders the morpholide unsuitable for its main use, which is as a delayed-action accelerator.

The following examples in which parts are by weight illustrate but do not limit the invention.

Example 1

Sodium mercaptobenzthiazole powder (28.35 parts), anhydrous sodium carbonate (1 part) and toluene (130 parts) are stirred together at 55–60° C., in a vessel provided with a water-cooled condenser, while a solution of N-chloromorpholine (20.1 parts) in toluene (43.3 parts) is slowly and uniformly added during about half an hour. Stirring is continued for a further half hour at the same temperature and then after heating to about 85° C. the reaction mixture is filtered hot to remove insoluble salts. The residue is washed with toluene (43.3 parts). The filtrate and washings are combined and the toluene distilled off under vacuum until the internal temperature is 90° C. at a pressure 20 to 25 mm.

The residual oil solidifies on cooling to yield 34.9 parts of substantially pure benzthiazyl sulphenomorpholide. This is a yield of 92.4%% calculated on the sodium mercaptobenzthiazole taken. The product contains only 0.5% of ether-insoluble matter including any dibenzthiazyl disulphide present.

The anhydrous sodium carbonate serves to absorb any small proportion of moisture which may be present.

Example 2

To a solution of potassium mercaptobenzthiazole (25 parts), in dioxan (200 parts) in a vessel provided with a dropping funnel and internal thermometer, there is slowly added during half an hour, while stirring at 20–25° C., a solution of N-chloromorpholine (15.5 parts) in dioxan (50 parts). During the addition the temperature rises to about 40–45° C. The temperature is then raised to 50–55° C. and kept at this with stirring for half an hour, after which it is reduced to 10–20° C. and the reaction mixture diluted with excess water. A light brown oil is precipitated which quickly solidifies to a light brown solid. The solid is filtered off, well washed with water and dried at 40–45° C. to yield 29 parts of substantially pure benzthiazyl sulphenomorpholide. This is a yield of 94.3% calculated on the potassium mercaptobenzthiazole taken.

Example 3

Sodium-2-mercaptobenzthiazole powder (56.6 parts), anhydrous sodium carbonate (2 parts) and xylene (173 parts) are stirred together at 48–52° C., in a vessel provided with a water-cooled condenser and dropping funnel, while a solution of N-chloromorpholine (38.2 parts) in xylene (34 parts) is slowly and uniformly added during about fifteen minutes. Stirring is continued for a further 4 hours at the same temperature. The reaction mixture is then heated to 70–75° C., maintained at this temperature for half an hour and the precipitated xylene-insoluble salts removed by washing three times with hot water (100, 50 and 50 parts) at 70° C. The washed xylene solution is filtered to remove traces of suspended material and the filtrate distilled under vacuum until the internal temperature is 90–95° C. at a pressure of 10–25 mm. The residual oil solidifies on cooling to yield 72.8 parts of substantially pure benzthiazyl sulphenomorpholide. This is a 96.5% yield calculated on the sodium mercaptobenzthiazole taken.

We claim:

1. A process for the manufacture of 2-benzthiazyl sulphenomorpholide which comprises adding a metal salt of 2-mercaptobenzthiazole in an inert non-ionizing organic solvent to a substantially equal molecular proportion of N-chloromorpholine in the same non-ionizing solvent and reacting said metal salt of 2-mercaptobenzthiazole in said N-chloromorpholine in admixture to a temperature between 40° and 70° C., and thereafter recovering the resulting 2-benzthiazyl sulphenomorpholide from the reaction mixture.

2. The process of claim 1, wherein said temperature is between 50° and 60° C.

3. The process of claim 2, wherein the sodium salt of said 2-mercaptobenzthiazole is employed and said organic solvent is selected from the group consisting of benzene, toluene, xylene, and dioxane.

4. The process of claim 2, wherein the potassium salt of said 2-mercaptobenzthiazole is employed and said organic solvent is selected from the group consisting of benzene, toluene, xylene, and dioxane.

References Cited in the file of this patent

UNITED STATES PATENTS

| | | |
|---|---|---|
| 2,730,526 | Kinstler | Jan. 10, 1956 |
| 2,730,527 | Kinstler | Jan. 10, 1956 |